Dec. 31, 1935.                L. RICEFIELD                2,025,824
                                COUPLING
                          Filed April 11, 1930          3 Sheets-Sheet 1
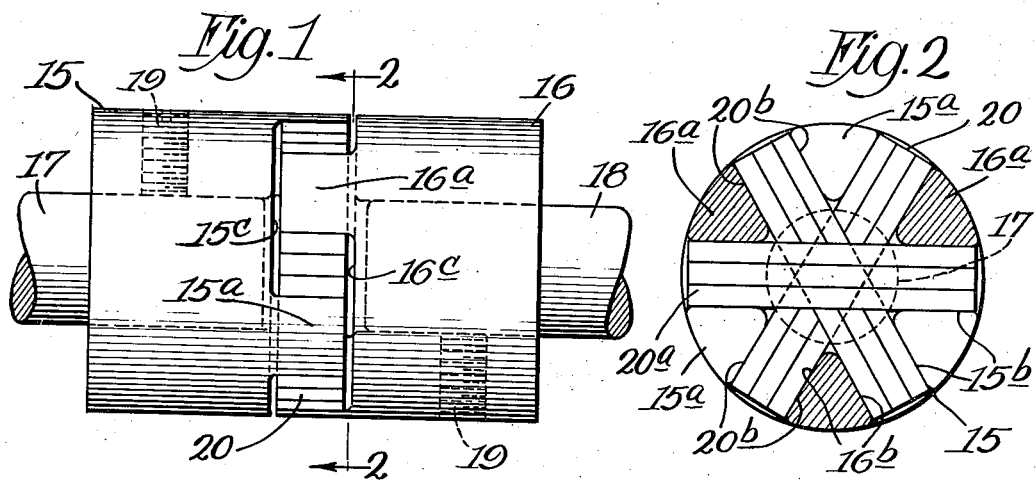
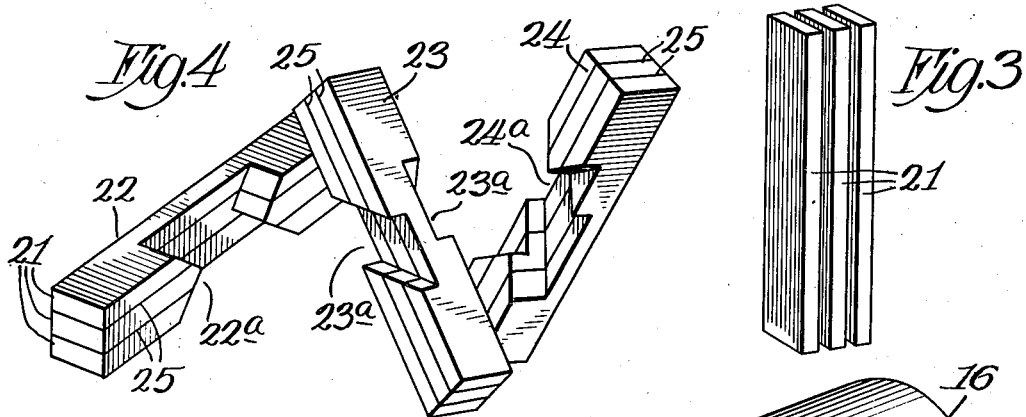
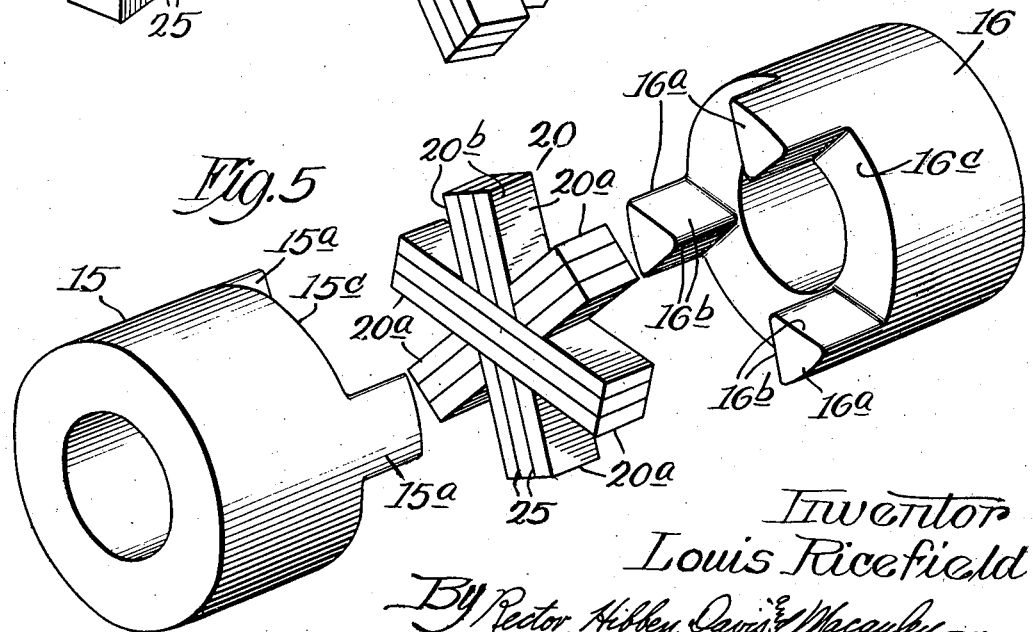
Inventor
Louis Ricefield

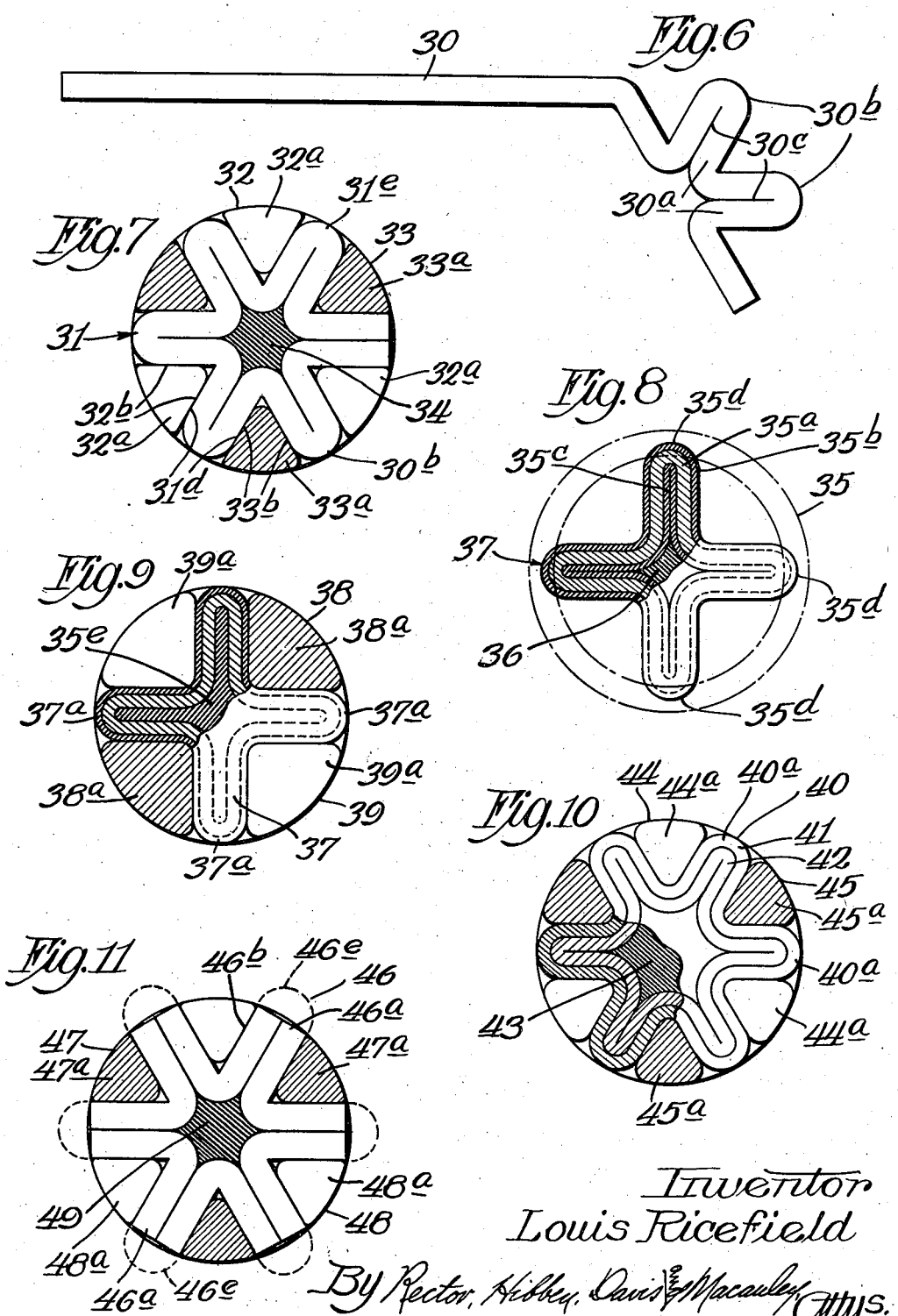

Dec. 31, 1935.     L. RICEFIELD     2,025,824
COUPLING
Filed April 11, 1930     3 Sheets-Sheet 3
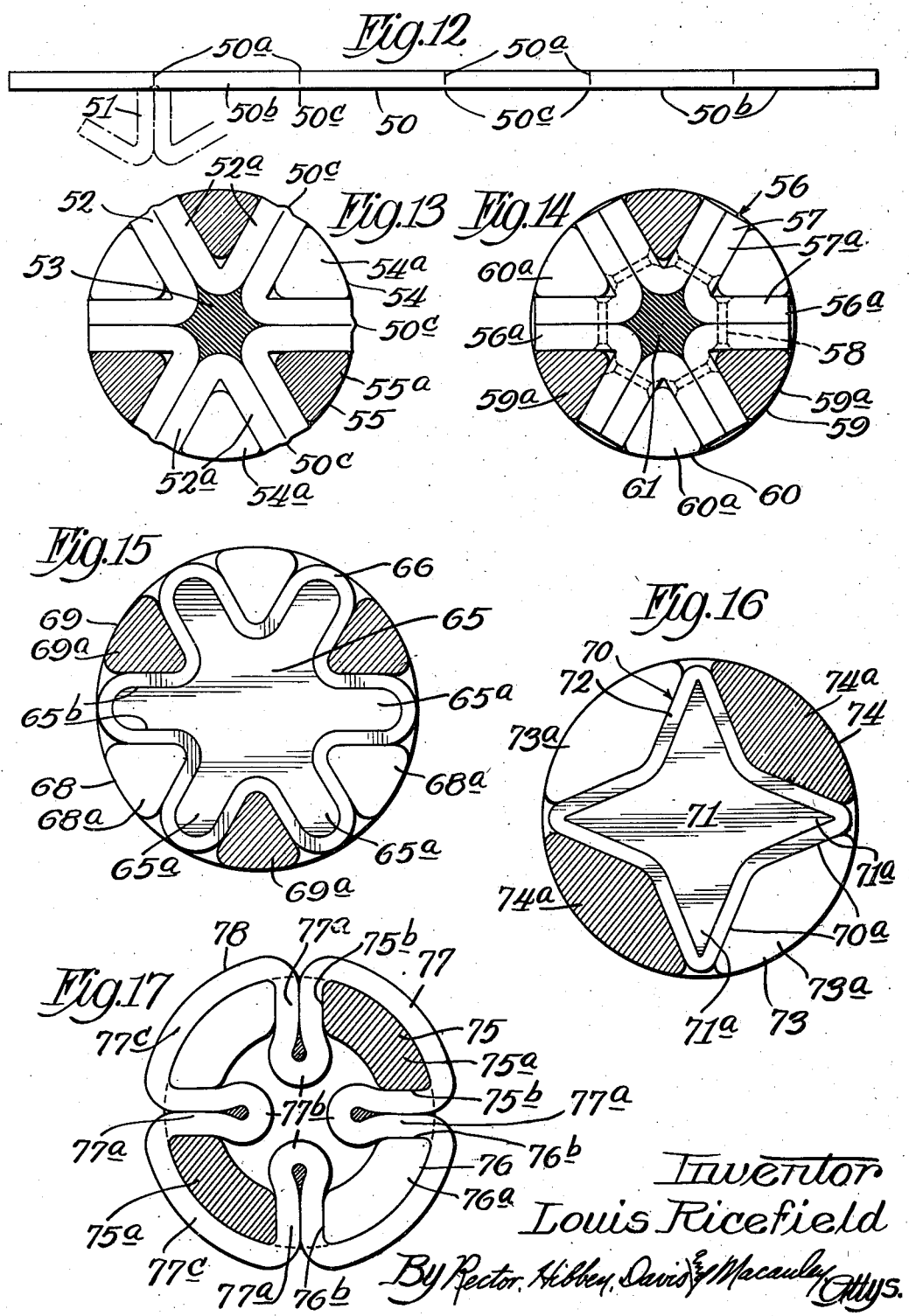

Patented Dec. 31, 1935

2,025,824

UNITED STATES PATENT OFFICE 2,025,824

COUPLING

Louis Ricefield, Oak Park, Ill.

Application April 11, 1930, Serial No. 443,349

12 Claims. (Cl. 64—14)

This invention relates to improvements in couplings of the type described and claimed in my prior co-pending application Serial No. 345,641, filed March 9, 1929. The purpose of the present invention is to provide a coupling for connecting substantially aligned shafts, comprising a pair of coupling members each adapted to be secured to one of said shafts and each having a plurality of longitudinally extending lugs arranged to coact with the radiating arms of an intervening spider of improved form provided with lug-engaging portions formed of one or more layers of wear resisting material which are cemented or otherwise secured to each other or to a central supporting structure.

In my prior application, above referred to, there is disclosed a coupling comprising a central, one-piece spider which is preferably composed largely or wholly of molded rubber and, although a spider of that form is well adapted to compensate for lack of alignment and end play of the connected shafts and to absorb shocks incident to starting and stopping the rotation of the shafts, it has been found that a spider formed largely of rubber is not entirely suitable for some uses where the parts of the coupling are subjected to the action of acids, oils, or other influences having a deleterious effect upon rubber. It is therefore the principal object of this invention to provide a coupling of this type comprising a built-up spider having wear-resisting parts formed of material, preferably more or less resilient, which is adapted to withstand the particular uses to which the coupling is put. A further object is to provide a coupling spider or power-transmitting member having outwardly extending arms each made up of a plurality of layers of material secured together, or to an intervening part, and having their major surfaces extending transversely to the directions in which forces are transmitted therethrough to and from the lugs of the coacting coupling members. Another object is to provide a coupling comprising a power-transmitting member having outwardly extending arms provided with outer contacting portions formed of leather or other somewhat resilient material having high wear resisting qualities or qualities rendering it proof against, or highly resistant to, the action of acids, water, oils or high temperatures. Still another object is to provide a coupling comprising a power-transmitting member having radiating laminated arms. A further object is to provide a coupling spider comprising a plurality of intersecting members secured together and each made up of a plurality of layers of material cemented or otherwise secured together. A further object is to provide a coupling spider made up of one or more pieces of leather or the like having parts thereof doubled upon each other and secured together to form radiating spider arms. A further object is to provide an improved coupling made up from an endless member by doubling portions of said member to form a plurality of radiating arms or lugs. Another object is to provide an improved method of forming a coupling. Other objects relate to various features of construction and arrangement which will appear more clearly hereinafter.

The nature of the invention will be understood from the following specification taken with the accompanying drawings, in which several embodiments are illustrated. In the drawings, Fig. 1 shows a side elevation of one form of the improved coupling;

Fig. 2 shows a transverse section taken on the line 2—2 of Fig. 1;

Fig. 3 is a perspective view of the separate laminations of one cross-member or unit of the spider member shown in Figs. 1 and 2.

Fig. 4 is a perspective view of the completed cross-members of the spider after they are ready for assembly;

Fig. 5 is a perspective view of the three principal members of the coupling spaced from each other in dis-assembled relation;

Fig. 6 shows a side elevation of the partially formed spider of a modified form of the invention;

Fig. 7 is a sectional view, similar to that of Fig. 2, showing the completed spider, formed as illustrated in Fig. 6, after it has been assembled with the complementary coupling members;

Fig. 8 shows a modified form of spider, partially in end elevation and partially in transverse section during the process of manufacture, formed by doubling upon themselves portions of an endless member which is illustrated in its initial form by dotted lines;

Fig. 9 shows an end elevation of the completed spider illustrated in Fig. 8 after it has been assembled with respect to the jaws of complementary coupling members and showing the inner layers of the endless member united with each other and with the central core after the parts have been vulcanized.

Fig. 10 shows a sectional view, similar to that of Fig. 2, through another modified form of coupling in which the spider member is formed by doubling adjacent portions of a plurality of superimposed endless members;

Fig. 11 is a sectional view similar to that of Fig. 2, showing a modification of the form of the invention illustrated in Fig. 7;

Fig. 12 shows a side elevation of a strip of leather, belting or other material which is partially slit therethrough at intervals to permit the formation of the arms of a spider by doubling upon each other the portions adjacent each slit or line of division;

Fig. 13 is a sectional view similar to that of Fig. 2 showing the completed coupling having the spider formed from the member illustrated in Fig. 12;

Fig. 14 is a sectional view similar to that of Fig. 2, illustrating another method of forming the spider illustrated in Fig. 11.

Fig. 15 is a sectional view similar to that of Fig. 2 showing another modification of the invention in which a central core having radiating arms is provided with an outer covering of leather, rubber, belting or other suitable material;

Fig. 16 is a sectional view similar to that of Fig. 2, showing still another modification of the invention wherein the lug-engaging surfaces of each spider arm do not extend parallel to each other as in the other forms of the invention; and Fig. 17 is a sectional view similar to that of Fig. 2 showing still another modification of the invention in which the power-transmitting member, instead of being formed as a spider, is provided with inwardly radiating arms which extend between the lugs carried by opposite coupling members.

The form of the invention illustrated in Figs. 1 to 5, inclusive, comprises two similar coupling members 15 and 16 which are adapted to be secured on the shafts 17 and 18, respectively, by setscrews 19 or other suitable fastening means. Between the coupling members 15 and 16, there is interposed a power-transmitting member or spider 20 having a plurality of radiating arms 20ª, each of which is arranged to coact with two of the lugs 15ª and 16ª which extend longitudinally from the coupling members 15 and 16, respectively. The lugs 15ª and 16ª are preferably formed integrally with the coupling members by which they are carried and they are substantially triangular in radial cross-section. Each lug 15ª has a pair of outwardly diverging flat surfaces 15ᵇ and each lug 16ª has a pair of similar outwardly diverging surfaces 16ᵇ, and these surfaces are so arranged that each surface 15ᵇ is parallel to the next adjacent surface 16ᵇ, while these two surfaces 15ᵇ and 16ᵇ are parallel to a radial line passing from the axes of the shafts midway between them. Each arm 20ª of the spider 20 has opposite parallel flat faces 20ᵇ which coact with the faces 15ᵇ and 16ᵇ of the next adjacent lugs formed on opposite coupling members. When the three members 15, 16 and 20 are assembled, as shown in Fig. 1, the ends of the lugs 15ª are spaced from the end surfaces 16ᶜ of the member 16 and the ends of the lugs 16ª are spaced from the end surfaces 15ᶜ of the member 15, while the radial end faces of the member 20 are spaced from both the end surfaces 15ᶜ and 16ᶜ of the coupling members. This normal spaced relation allows relative end play of the connected shafts 17 and 18, during which the lugs and the spider arms have relative sliding movement on each other. Radial misalignment and angular misalignment of the shafts is compensated for by relative sliding or relative sliding and turning movements of the contacting parts of the lugs and the arms of the spider and by the deformation of the spider.

The power-transmitting spider 20 is made up of a number of laminations 21 of leather, fibre, woven fabric or other suitable material, preferably having some resiliency, and these laminations are first cut in oblong rectangular form, as shown in Fig. 3, and then secured together by glue, cement, or other fastening means. Having secured the laminations together to form three laminated members of equal thickness, the laminations are cut away at their central parts to form three units or cross-members 22, 23 and 24, as shown in Fig. 4, which are alike except for the shape of the central notches 22ª, 23ª and 24ª which are formed therein. The unit 23 fits between the other two and has notches 23ª in both sides thereof to receive and closely fit the other two units and the notches 22ª and 24ª are also shaped to embrace and fit the complementary units so that when they are assembled they have the form shown in Fig. 5 with all portions of each end surface of the spider lying in one plane. The three units 22, 23 and 24 are then secured together by glue or other fastening means to form the completed spider 20. The flat surfaces 25, along which adjacent laminations are united with each other in the completed spider, are preferably so arranged that they extend transversely to the directions in which forces are transmitted through the spider arms 20ª to and from the lugs of the coupling members. The ends of the spider should preferably not extend beyond the cylindrical outer surfaces of the members 15 and 16.

In Figs. 6 and 7 there is illustrated a modified form of construction in which the coupling spider is formed from a single strip of leather, belting, or other suitable material 30 having portions 30ª thereof doubled upon each other and reversely directed to form a plurality of spider arms 30ᵇ, the complementary layers of each arm being glued or otherwise secured together along the surfaces 30ᶜ. In some cases, the portions which form the radiating arms of the spider may be permanently set in their final form during the process of manufacture so that they will retain their relative positions without being glued or otherwise secured to each other. The ends of the strip 30 may be directed outwardly in contact with each other and secured together to form the complete, substantially integral, spider 31 as shown, although it is not essential that the ends of the strip 30 be connected if they be located at the inner ends of two adjacent arms 30ᵇ because the forces transmitted through the spider are compressive strains transmitted through the spider arms and there are no substantial stresses exerted upon the central hub-portion of the spider. If desired, two or more strips 30 may be employed, one within the other, in which case each spider arm will have more than two laminations. The completed spider 31 is mounted in floating position between two coupling members, like those shown in Fig. 1, which are secured to the two substantially aligned shafts to be connected. These coupling members 32 and 33, as shown in Fig. 7, have lugs 32ª and 33ª projecting endwise therefrom with each of the outwardly diverging surfaces 32ᵇ on the lugs 32 extending parallel to one of the similar flat surfaces 33ᵇ formed on an adjacent lug of the other coupling member, as in the form of the invention first described. The adjacent flat faces 32ᵇ and 33ᵇ of two adjacent lugs contact with the opposite faces 31ᵈ of one of the spider arms through forces transmitted from one lug to the other. The spider preferably has a central core 34 which may be formed of rubber or other resilient material and glued or otherwise secured in place.

Instead of forming the radiating arms of the spider by doubling portions of a member having the form shown in Fig. 6, the spider may be formed from an endless member by doubling portions thereof upon each other as illustrated in Fig. 8. In this modification, the spider is formed from an endless member 35 which may be an endless belt having one or more inner layers 35$^a$ made up of suitable fabric or the like, an outer layer 35$^b$ formed largely or wholly of rubber, and an inner layer 35$^c$ formed of rubber. Of course, the layer or layers 35$^a$ may be more or less impregnated with rubber. This endless member 35 has adjacent portions thereof doubled upon themselves to form a number of radiating arms 35$^d$, as shown in Fig. 8, and the space at the center of the spider thus formed is occupied by a core 36 of such shape that it fits the surfaces of the inner layer 35$^c$ when the spider 37 has been formed by doubling adjacent portions of the endless member 35. In case the spider 37 is formed from belting having outer surface layers of rubber, it is subjected to a subsequent process of heating and vulcanization which causes the central core 36 to be integrally united with the inner rubber layer 35$^c$ while at the same time causing the contacting portions of the layer 35$^c$ to unite with each other, thus forming one integral rubber member 35$^e$, as shown in Fig. 9, which constitutes the core of the spider. In the event that the spider is not formed from rubber, belting or the like, the core 36 may be united to the other parts of the spider by cement or other fastening means. When the spider has been completely formed, as shown in Fig. 9, it is adapted to be assembled with coupling members 38 and 39 which have complementary lugs 38$^a$ and 39$^a$ extending endwise therefrom to receive the arms 37$^a$ of the spider between them so that forces are then transmitted from one coupling member to the other through the arms 37$^a$. When these forces are transmitted, the central resilient core portion permits deformation of the spider arms while at the same time preventing them from being forced inwardly to an undue extent under the influence of the forces which are set up during the rotation of connected shafts which are out of exact alignment.

In Fig. 10 there is illustrated another modification of the invention in which the spider 40 is preferably constructed after the manner illustrated in Figs. 8 and 9, although it is made up from a plurality of endless members 41 and 42, each of which may be an endless belt comprising inner layers of fabric and the like and surface layers formed largely or wholly of rubber. These layers of the members 41 and 42 have portions thereof doubled upon themselves to form the spider arms 40$^a$ extending outwardly from a central core 43, formed preferably of rubber, which may be united with the inner layer of the member 42 by a process of vulcanization, or by glue or cement in case the member 42 does not have an inner surface of rubber. When the members 41 and 42 both have surface portions formed of rubber, they may be united with each other by a process of vulcanization at the same time that the core 43 is secured in place. If the members 41 and 42 are not formed of rubber belting, the contacting portions of each member and of adjacent members which form the spider arms 40$^a$, may be secured together by cement or other fastening means. The radiating spider arms 40$^a$ are adapted to extend between the lugs 44$^a$ and 45$^a$ which extend endwise from complementary coupling members 44 and 45, as in the forms of the invention previously described. This modification of the invention permits the spider to be made up conveniently from a plurality of layers of endless material which may have different characteristics or qualities of resistance to wear so that the spider may be best adapted to withstand the influences to which it is subjected in use.

In the form of the invention illustrated in Fig. 7, the rounded end surfaces 31$^e$ of the spider arms make it impossible to secure the maximum area of contact between the spider arms and the flat surfaces of the lugs, if the arms be of such length as not to project beyond the outer peripheral surfaces of the coupling members. This difficulty may be overcome, as shown in Fig. 11, by forming the completed spider 46 from a single strip of leather, belting or other suitable material, in the manner explained in connection with Figs. 6 and 7, but with longer spider arms 46$^a$, and then cutting off the outer rounded ends 46$^e$ of these arms so that the flat sides 46$^b$ of the resulting laminated arms contact to their extreme outer ends with the flat faces of the lugs 47$^a$ and 48$^a$ formed on the coupling members 47 and 48, respectively. In this construction, as in that shown in Fig. 7, the spider 46 is preferably provided with a core 49 which may preferably be formed of rubber or other resilient material so that some deformation of the spider is permitted without allowing the spider arms to be forced radially inward to an undue extent.

In Figs. 12 and 13 there is illustrated still another modification of the invention which resembles the forms shown in Figs. 7 and 11 although the process of manufacture differs therefrom. In order to gain the advantage of a maximum area of contact between the spider arms and the lugs of the coupling members while at the same time having adjacent layers of the spider arms united with each other, the spider is formed from a continuous strip of leather, belting, or other material 50 having the form shown in Fig. 12. This strip of material is cut transversely at equally spaced intervals as shown at 50$^a$ but the cuts do not extend entirely therethrough so that the adjacent sections 50$^b$ of the strip of material are united by comparatively thin connecting portions 50$^c$. These parts 50$^c$ form hinges about which the ends of adjacent sections 50$^b$ are doubled upon each other as shown by dotted lines at 51, thus forming a plurality of spider arms 52$^a$ which form parts of the complete spider 52 illustrated in Fig. 13. The ends of the layers which form each spider arm, except one, are thus united with each other and the end portions of the remaining layer may be united with each other by cement or other fastening means. A core 53 is preferably mounted within the spider and secured to the contacting portions of the strip 50 by cement, or by a process of vulcanization in case the member 50 has an inner surface layer of rubber and the member 53 is also formed of rubber. The spider arms 52$^a$ are adapted to contact with the lugs 54$^a$ and 55$^a$ which are formed on coupling members 54 and 55, respectively, having the form previously described.

In Fig. 14 there is illustrated another modification of the invention which has the advantages of the forms illustrated in Figs. 11 and 13, insofar as the area of contact between the spider arms and the lugs of the coupling members is concerned, but the form illustrated in Fig. 14 has a spider 56 made up of a plurality of separate members 57, instead of being formed initially from one strip of leather or other material. In this modification, a series of identical strips 57 of leather, belting, asbestos, fibre or other material are bent into V-shaped form and the arms 57ª of one member are secured to the similar arms of the next adjacent member by rivets, wire stitching or the like, indicated at 58, thus forming the laminated arms 56ª of the spider 56 with flat outer ends on the spider arms and with each arm having parallel opposite flat faces which are adapted to contact with the flat faces of the lugs 59ª and 60ª which are formed on the coupling members 59 and 60, respectively. The core 61, formed preferably of rubber or the like, may be mounted within the arms of the spider to occupy the space enclosed by the members 57. This core is initially stamped or otherwise formed so that its external surfaces fit the inner surfaces of the member 57 and is secured to these members by cement or other fastening means, depending upon the material from which the spider arms 56ª are formed.

In Fig. 15, there is illustrated another modification in which the strip of leather, rubber belting, asbestos cloth, or the like, which provides the wear-resisting portion of the spider, is mounted upon an inner core, formed either of solid or resilient material. The core 65, formed of steel, rubber or the like, has a number of integral radiating spider arms 65ª each having opposite outwardly extending flat surfaces 65ᵇ located in planes parallel to a radius of the spider passing midway between them. The entire outer peripheral surface of the member 65 is covered by a layer 66, formed preferably of leather or other wear-resisting material, which is cemented or otherwise secured thereto, forming a wear-resisting and shock-absorbing portion of the completed spider 67. The arms of the spider extend between and contact with the lugs 68ª and 69ª which are formed on coupling members 68 and 69, respectively, secured on the shafts which are connected by the coupling.

Another modification of the invention is shown in Fig. 16, wherein the surfaces of each spider arm which contact with two adjacent lugs carried by opposite coupling members do not extend parallel to each other. In this form, the spider 70 has a core 71 of metal or rubber, for example, with an outer covering 72 which may be formed of leather, rubber belting, fireproof fabric or other material. In this form, the spider has only four arms 70ª each made up of a projection 71ª of the core with the outer covering 72 applied thereto. The surfaces of the arms 71ª and the corresponding surfaces of the spider arms 70ª converge outwardly on each arm and these surfaces of the spider arms contact directly with the similarly inclined surfaces of the lugs 73ª and 74ª which are formed on the coupling members 73 and 74, respectively, secured on the substantially aligned shafts which are connected by the coupling.

In Fig. 17 of the drawings there is illustrated still another modification of the invention in which the coupling members 75 and 76 are provided with longitudinally extending lugs 75ª and 76ª, respectively, arranged to project longitudinally adjacent the outer peripheral portions of the coupling members. These lugs 75ª and 76ª have inwardly extending edge surfaces 75ᵇ and 76ᵇ which are so arranged that these surfaces on adjacent lugs extend parallel to each other and parallel to a plane passing through the axis of the coupling member. The surfaces 75ᵇ and 76ᵇ terminate some distance outwardly from the axis of the coupling and these surfaces on adjacent lugs are adapted to receive between them one of the arms 77ª formed on the power-transmitting member 77. In this case, the arms 77ª are formed by doubling inwardly portions of an endless member 78 and the rounded or bowed portions 77ᵇ which constitute the inner ends of the arms lie within the inner boundaries of the lugs 75ª and 76ª. The arms 77ª of the power-transmitting member are connected by the outer curved portions 77ᶜ each of which extends over the outer peripheral surface of one of the lugs 75ª or 76ª. The lugs thus serve to restrain the arms of the power transmitting member from excessive inward movement and make it unnecessary to provide the power-transmitting member with a core for sustaining the arms in proper relation to each other. The members 78 from which the power-transmitting member is formed may be an endless belt formed of fabric and rubber or leather, or other material adapted for the purpose. This form of the invention is claimed in my copending divisional application Serial No. 31,777, filed July 17, 1935.

Although several different forms of the invention have been shown and described, it will be understood that the invention may be constructed in various other embodiments and formed by various methods within the scope of the appended claims.

I claim:

1. The combination in a coupling for connecting substantially aligned shafts, of a pair of coupling members adapted to be secured on separate shafts, and a laminated power-transmitting member having a resilient central non-metallic core and mounted between said coupling members with parts thereof coacting with parts of said coupling members.

2. The combination in a coupling for connecting substantially aligned shafts, of a pair of coupling members adapted to be secured on separate shafts, each of said coupling members having lugs extending therefrom longitudinally of said shafts and intermeshing loosely with the lugs of the other coupling member, and a spider located between said coupling members and comprising a core having a fixed connection with multi-layered outwardly extending arms each rigidly connected to said core and projecting between and contacting with two of said lugs carried by opposite coupling members, the lug-engaging layers of said arms being formed of yielding wear-resisting material.

3. The combination in a coupling for connecting substantially aligned shafts, of a pair of coupling members adapted to be secured on separate shafts, each of said coupling members having lugs extending therefrom longitudinally of said shafts and intermeshing loosely with the lugs of the other coupling member, and a spider located between said coupling members and comprising a resilient core having laminated outwardly extending arms each rigidly connected to said core and projecting between and contacting with two of said lugs carried by opposite coupling members on flat surfaces extending transversely to the directions in which forces are transmitted between said coupling members.

4. The combination in a coupling for connecting substantially aligned shafts, of a pair of coupling members adapted to be secured on separate shafts, each of said coupling members having lugs extending therefrom longitudinally of said shafts and intermeshing loosely with the lugs of the other coupling member, and a spider comprising a core having secured thereto a plurality of angularly bent strips of wear-resisting material, one part of each angularly bent strip being secured to a similar part of the next adjacent strip to form a plurality of radially extending arms, each arranged to extend between two lugs carried by opposite coupling members.

5. The combination in a coupling for connecting substantially aligned shafts, of a pair of coupling members adapted to be secured on separate shafts, each of said coupling members having lugs extending therefrom longitudinally of said shafts and intermeshing loosely with the lugs of the other coupling member, and a spider comprising a core having secured thereto a plurality of angularly bent strips of wear-resisting material, one part of each angularly bent strip being secured to a similar part of the next adjacent strip to form a plurality of radially extending arms each arranged to extend between two lugs carried by opposite coupling members, the surfaces of the contacting parts of adjacent strips coacting with each other and with the surfaces of the contacting lugs in planes extending parallel to radial planes containing the longitudinal axis of said shafts.

6. The combination in a coupling for connecting substantially aligned shafts, of a pair of coupling members adapted to be secured on separate shafts, each of said coupling members having lugs extending therefrom longitudinally of said shaft and intermeshing loosely with the lugs of the other coupling member, and a spider comprising a plurality of radiating arms each formed of a plurality of layers of wear-resisting material secured together and having their outer surfaces contacting with the surfaces of opposite lugs carried by opposite coupling members, said arms being connected at their inner ends to a central core.

7. The combination in a coupling for connecting substantially aligned shafts, of a pair of coupling members adapted to be secured on separate shafts, each of said coupling members having lugs extending therefrom longitudinally of said shaft and intermeshing loosely with the lugs of the other coupling member, and a spider comprising a plurality of radiating arms each formed of a plurality of layers of wear-resisting material secured together and having their outer surfaces contacting with the surfaces of opposite lugs carried by opposite coupling members, said arms being connected at their inner ends to a central core, said core being formed of resilient material.

8. The combination in a coupling for connecting substantially aligned shafts, of a pair of coupling members adapted to be secured on separate shafts, each of said coupling members having lugs extending therefrom longitudinally of said shafts and intermeshing loosely with the lugs of the other coupling member, and a spider comprising a resilient core and a plurality of V-shaped members formed of compressible wear-resisting material and having each arm thereof secured to an arm of an adjacent V-shaped member to form a spider on which each arm is adapted to project between two of said lugs carried by opposite coupling members.

9. The combination in a coupling for connecting substantially aligned shafts, of a pair of couplings mounted to be secured on separate shafts, each of said coupling members having lugs extending therefrom longitudinally of said shafts and intermeshing loosely with the lugs of the other coupling member, and a spider comprising a rubber core united with a plurality of V-shaped leather members having each arm thereof secured to an arm of an adjacent V-shaped member to form a spider of which each arm is adapted to project between two of said lugs carried between opposite coupling members.

10. The combination in a coupling member for connecting substantially aligned shafts, of a pair of coupling members adapted to be secured on separate shafts, each of said coupling members having lugs extending therefrom longitudinally of said shafts and intermeshing loosely with the lugs of the other coupling member, and a spider interposed between said coupling members and having radially extending arms each contacting with the surfaces of the lugs carried by opposite coupling members, each of said arms being made up of a plurality of layers of material having different characteristics, said layers varying in compressibility and wear-resisting qualities.

11. The combination in a coupling member for connecting substantially aligned shafts, of a pair of coupling members adapted to be secured on separate shafts, each of said coupling members having lugs extending therefrom longitudinally of said shafts and intermeshing loosely with the lugs of the other coupling member, and a spider interposed between said coupling members and having radially extending arms each contacting with the surfaces of the lugs carried by opposite coupling members, said arms being formed by doubling upon themselves a plurality of layers of material having different characteristics, the outermost layer of material on each arm having great wear-resisting qualities.

12. The combination in a coupling member for connecting substantially aligned shafts, of a pair of coupling members adapted to be secured on separate shafts, each of said coupling members having lugs extending therefrom longitudinally of said shafts and intermeshing loosely with the lugs of the other coupling member, and a spider interposed between said coupling members and having radiating arms each contacting with two lugs carried by opposite coupling members, said spider comprising a resilient core having radiating arms, said arms being covered by a plurality of layers of material having different characteristics, the outermost layer of material on each arm having high wear-resisting qualities.

LOUIS RICEFIELD.